(12) United States Patent
Trice (10) Patent No.: US 12,366,365 B2
(45) Date of Patent: Jul. 22, 2025

(54) MOUNTING BRACKET FOR OVER-THE-RANGE COOKING APPLIANCE

(71) Applicant: Midea Group Co., Ltd., Foshan (CN)

(72) Inventor: Daniel J. Trice, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 523 days.

(21) Appl. No.: 17/353,666

(22) Filed: Jun. 21, 2021

(65) Prior Publication Data

US 2022/0404031 A1    Dec. 22, 2022

(51) Int. Cl.
*F24C 15/20*    (2006.01)
*F16M 13/02*    (2006.01)

(52) U.S. Cl.
CPC ......... *F24C 15/2071* (2013.01); *F16M 13/02* (2013.01); *F24C 15/2042* (2013.01)

(58) Field of Classification Search
CPC .... H05B 6/6429; F24C 15/2071; F24C 15/20; F16L 25/0009
USPC ..................................... 126/299 R
See application file for complete search history.

(56) References Cited

U.S. PATENT DOCUMENTS

| | | |
|---|---|---|
| 3,627,248 A | 12/1971 | Nelson |
| 3,804,211 A | 4/1974 | Scherzinger |
| 3,814,363 A | 6/1974 | Brelosky |
| 3,954,244 A | 5/1976 | Gopstein |
| 3,970,273 A | 7/1976 | Tanner |
| 4,012,058 A | 3/1977 | Patton |
| 4,313,043 A * | 1/1982 | White ................. F24C 15/2042 219/757 |
| 4,327,274 A | 4/1982 | White et al. |
| 4,453,690 A | 6/1984 | Takeuji |
| 4,457,436 A | 7/1984 | Kelley |
| 4,465,256 A | 8/1984 | Wolbrink et al. |
| 4,580,853 A | 4/1986 | Hitzeroth et al. |
| 4,584,986 A * | 4/1986 | Cannata ................ F24B 1/1806 126/318 |

(Continued)

FOREIGN PATENT DOCUMENTS

| | | |
|---|---|---|
| AT | 411925 B | 7/2004 |
| CN | 1704653 A | 12/2005 |

(Continued)

OTHER PUBLICATIONS

Transmittal of Related Applications dated Jun. 22, 2021.

(Continued)

*Primary Examiner* — Steven B McAllister
*Assistant Examiner* — John E Bargero
(74) *Attorney, Agent, or Firm* — Gray Ice Higdon (57) ABSTRACT

A bracket for mounting an over-the-range cooking appliance, where the bracket includes: a bracket body adapted to be secured to a wall and support a cooking appliance, the bracket body further including a vent opening to engage an exhaust of the cooking appliance; an exhaust adaptor, where the exhaust adaptor further includes: a first side and a second side, and the first side is located opposing the second side with a through opening; where the second side of the exhaust adaptor is adapted to engage an external vent; and when the first side of the exhaust adaptor is engaged with the bracket body at the vent opening, there is fluid communication between the vent opening and the exhaust adaptor.

18 Claims, 10 Drawing Sheets

(56) References Cited

U.S. PATENT DOCUMENTS

| | | | |
|---|---|---|---|
| 4,635,615 A | 1/1987 | Itoh et al. | |
| 4,659,047 A | 4/1987 | Haller | |
| 4,666,113 A | 5/1987 | Itoh et al. | |
| 4,720,622 A | 1/1988 | Iwata et al. | |
| 4,753,406 A | 6/1988 | Kodama et al. | |
| 4,795,121 A | 1/1989 | Comito | |
| 4,796,850 A | 1/1989 | Aramaki | |
| 4,824,061 A * | 4/1989 | Sumikama | F24C 15/2071 248/225.21 |
| 4,898,149 A | 2/1990 | Cohn | |
| 5,014,945 A | 5/1991 | Miller | |
| 5,096,230 A | 3/1992 | Pausch et al. | |
| 5,257,468 A * | 11/1993 | Leburn | 34/235 |
| 5,482,232 A | 1/1996 | Wynn | |
| 5,590,641 A * | 1/1997 | Duong | F24C 3/004 126/85 B |
| 5,676,440 A | 10/1997 | Garber et al. | |
| 6,018,158 A | 1/2000 | Kang | |
| 6,222,171 B1 | 4/2001 | Fukuda et al. | |
| 6,341,754 B1 | 1/2002 | Melito et al. | |
| 6,369,372 B1 | 4/2002 | Kim | |
| 6,512,214 B2 | 1/2003 | Jeong et al. | |
| 6,554,880 B1 * | 4/2003 | Northcutt | B01D 46/10 55/DIG. 35 |
| 6,584,702 B2 | 7/2003 | Irey | |
| 6,660,984 B1 | 12/2003 | Jeong et al. | |
| 6,737,622 B1 | 5/2004 | Jeong et al. | |
| 6,894,259 B2 | 5/2005 | Lee | |
| 6,894,260 B2 | 5/2005 | Yamauchi | |
| 7,030,348 B1 | 4/2006 | Kim | |
| 7,129,452 B2 | 10/2006 | Cho | |
| 7,282,683 B2 | 10/2007 | Yamauchi et al. | |
| 7,348,527 B2 | 3/2008 | Braunisch | |
| 9,243,734 B2 | 1/2016 | Aubert et al. | |
| 9,719,251 B2 | 8/2017 | Gosling | |
| 9,897,330 B2 | 2/2018 | Bruin-Slot et al. | |
| 9,897,331 B2 | 2/2018 | Zachary | |
| 10,018,365 B2 | 7/2018 | Bruin-Slot et al. | |
| 10,145,054 B2 | 12/2018 | Federico | |
| 10,302,308 B2 | 5/2019 | Peng | |
| 10,317,093 B2 | 6/2019 | Bruin-Slot et al. | |
| 10,539,329 B2 | 1/2020 | Gauthier et al. | |
| 10,633,783 B1 | 4/2020 | Kelley | |
| 10,660,438 B2 | 5/2020 | Hognaland | |
| 10,663,175 B2 | 5/2020 | Jang | |
| 10,709,240 B2 | 7/2020 | Hira et al. | |
| 11,460,193 B2 | 10/2022 | Gayakwad | |
| 11,864,296 B2 | 1/2024 | Scalf et al. | |
| 2005/0178763 A1 | 8/2005 | Yamauchi | |
| 2009/0252548 A1 | 10/2009 | Laible | |
| 2016/0003270 A1 | 1/2016 | Franklin | |
| 2016/0195279 A1 | 7/2016 | Naber | |
| 2016/0341432 A1 * | 11/2016 | Sinur | F24C 15/2071 |
| 2017/0065077 A1 | 3/2017 | Behroozi | |
| 2018/0192807 A1 | 7/2018 | Hall | |
| 2018/0340695 A1 | 11/2018 | Park | |
| 2019/0113241 A1 | 4/2019 | Zhang et al. | |
| 2019/0203881 A1 | 7/2019 | Wu | |
| 2019/0223593 A1 | 7/2019 | Hira | |
| 2020/0224676 A1 | 7/2020 | Gazerro | |
| 2020/0292291 A1 | 9/2020 | Duz | |
| 2020/0373743 A1 | 11/2020 | Chambers | |
| 2022/0141927 A1 | 5/2022 | Scalf et al. | |
| 2022/0400850 A1 | 12/2022 | Trice | |
| 2022/0400860 A1 | 12/2022 | Trice | |
| 2022/0404030 A1 | 12/2022 | Trice | |
| 2023/0404260 A1 | 12/2023 | Trice et al. | |
| 2024/0147584 A1 | 5/2024 | Scalf | |
| 2024/0423363 A1 | 12/2024 | Trice | |

FOREIGN PATENT DOCUMENTS

| | | |
|---|---|---|
| CN | 108344018 A | 7/2018 |
| CN | 210241107 U | 4/2020 |
| DE | 3839931 A1 | 5/1990 |
| DE | 4340255 A1 | 6/1995 |
| DE | 10128026 A1 | 12/2002 |
| DE | 10357575 A1 | 7/2004 |
| DE | 102005057153 A1 | 5/2007 |
| DE | 102005057160 A1 | 5/2007 |
| DE | 102010055986 A1 | 5/2012 |
| EP | 0130029 A1 | 1/1985 |
| GB | 2142669 A | 1/1985 |
| KR | 880000748 Y1 | 3/1988 |
| KR | 880002241 Y1 | 6/1988 |
| KR | 19980030344 U | 8/1998 |
| KR | 19980030345 U | 8/1998 |
| KR | 19980036833 U | 9/1998 |
| KR | 19980045009 U | 9/1998 |
| KR | 19990032462 A | 5/1999 |
| KR | 20000010025 A | 2/2000 |
| KR | 100244311 B1 | 3/2000 |
| KR | 20010055487 A | 7/2001 |
| KR | 200271639 Y1 | 4/2002 |
| KR | 20030059878 A | 7/2003 |
| KR | 20070065133 A | 6/2007 |
| KR | 20080057729 A | 6/2008 |
| KR | 20110002949 U | 3/2011 |

OTHER PUBLICATIONS

Fulton Store, Side Mount Heavy Duty Steel Furniture Leg Leveling Feet, Adjustable Height with Round Foot Ideal for Desks, Tables, Shelving Units, Shop Cabinets and Furniture, retrieved from: https://www.amazon.com/Adjustable-Furniture-Levelers-Shelving-Cabinets/dp/B06ZXSXL5Z, Retrieved on: Jun. 9, 2023.

Mason Ind., 20,000 lb Capacity, 3-1/2 Wide x 6" Long, 1/2" Pad, Wedge Jack, retrieved from: https://www.mscdirect.com/product/details/88000906; Retrieved on: Jan. 30, 2023.

Wobble Wedges Store, Wobble Wedge BigGap Rigid Plastic Shims, Multipurpose Wdges for Home Improvement & Work, Leveling Pads for Large Gaps & Heavy Loads, Furniture Appliance Levelers, Retrieved from: https://www.amazon.com/Wobble-Wedges-BigGap-Plastic-Shims/dp/B08KVV6JRM?th=1; Retrieved on: Jan. 30, 2023.

Majestic, Majestic BKTLA7C LED TV Wall Mount Slide Bracket for Easy TV Removal, Retrieved from: https://majesticelectronics.us/tv-mounts/16-majesetic-bktla7c-led-tv-wall-mount-bracket-easy-remove.html , Retrieved on Oct. 27, 2020.

Nardi, Tom, 3D Printed Magnetic Dust Port Keeps Shop Clean, Hackaday, Aug. 29, 2018.

Sterling, Amy Jo., United States Patent and Trademark Office, Notice of Allowance issued in U.S. Appl. No. 17/089,196, 46 pages, dated Aug. 2, 2023.

Salone, Bayan, United States Patent and Trademark Office, Notice of Allowance issued in U.S. Appl. No. 17/353,654, 150 pages, dated Apr. 10, 2024.

Tran-Le, Thao Uyen, United States Patent and Trademark Office, Final Office Action issued in U.S. Appl. No. 17/353,647, 51 pages, dated Aug. 15, 2024.

Tran-Le, Thao Uyen, Non-Final Office Action issued in U.S. Appl. No. 17/353,647, 111 pages, dated Apr. 26, 2024.

Salone, Bayan, United States Patent and Trademark Office, Notice of Allowance issued in U.S. Appl. No. 18/210,983, 71 pages, dated Sep. 30, 2024.

Sterling, Amy Jo, United States Patent and Trademark Office, Non-Final Office Action issued in U.S. Appl. No. 18/400,809, 54 pages, dated Nov. 12, 2024.

Namay, Daniel Elliot, Non-Final Office Action issued in U.S. Appl. No. 17/353,671, 218 pages, dated Jan. 18, 2024.

* cited by examiner

MOUNTING BRACKET FOR OVER-THE-RANGE COOKING APPLIANCE

CROSS-REFERENCE TO RELATED APPLICATIONS

This application is related to the following applications, each of which is filed on even date herewith and assigned to the same assignees as the present application: U.S. patent application Ser. No. 17/353,647 entitled "A Microwave Cooking Appliance Having a Connector System for an External Vent"; U.S. patent application Ser. No. 17/353,654 entitled "Mounting Bracket Assembly for Appliance"; U.S. patent application Ser. No. 17/353,671 entitled "Mounting Bracket for Over-the-Range Cooking Appliance with Drill Guide". The disclosures of each of these applications are incorporated by reference herein.

BACKGROUND

Cooking appliances, and in particular microwave cooking appliances, are commonly used for residential cooking, and are often installed over a range or cooktop. The installation of cooking appliance over a range or cooktop is a lengthy process and often requires two individuals to complete. Furthermore, installation of these units may necessitate drilling many holes into the surrounding cabinetry. During installation of a typical over-the-range cooking appliance, a first individual may be required to hold the appliance in position underneath a wall cabinet while a second individual drives several mounting screws through the wall cabinet from within the interior of the wall cabinet. Furthermore, externally vented units may require that additional ducting be connected to the over-the-range cooking appliance via an exhaust adapter and ductwork, which may be difficult for an installer(s) to visualize.

Accordingly, a need continues to exist in the art for a manner of simplifying mounting of an over-the-range cooking appliance and connecting the external duct work to the over-the-range cooking appliance exhaust adapter.

SUMMARY

The herein-described embodiments address these and other problems associated with the art by providing a bracket for mounting an over-the-range cooking appliance, the bracket including: a bracket body to be secured to a wall and support the cooking appliance, the bracket body further including: a vent opening to engage an exhaust of the cooking appliance when installed; at least one channel defined by at least one receiving tab disposed proximate the vent opening; an exhaust adaptor including a first side and a second side, where the first side is disposed opposing the second side with a through opening; where the second side of the exhaust adaptor engages an external vent when installed; and where when the first side of the exhaust adaptor is slidably engaged with the at least one channel defined by the at least one receiving tab by movement of the bracket body in a first direction, there is fluid communication between the vent opening and the exhaust adaptor.

In some implementations, the exhaust adaptor further includes at least one flange projecting from a perimeter of the exhaust adaptor, where the at least one channel of the at least one receiving tab slidably engages the at least one flange. In some implementations, the at least one channel defined by the at least one receiving tab restricts movement of the exhaust adaptor in a second direction, where the second direction is perpendicular to the first direction.

In some implementations, the exhaust adaptor further includes a damper disposed within the through opening. In various implementations, the bracket additionally includes a gasket, where the gasket surrounds a perimeter surface of the vent opening and is disposed between the bracket body and the over-the-range cooking appliance, when the cooking appliance is installed. In some implementations, the bracket body additionally includes installation openings for mounting the bracket body on the wall. In some implementations, the bracket body further additionally includes a cooperating latch member to latch to a second cooperating latch member disposed on the cooking appliance. In various implementations, the bracket body further includes an arcuate notch defining an outer periphery of the bracket body to receive a drill paddle.

In various implementations, the vent opening is a first vent opening, and the bracket body further includes a second vent opening, where the first side of the exhaust adaptor is adapted to engage either the first vent opening or the second vent opening based on a position of the external vent. In some such implementations, the bracket body may additionally include a first channel defined by a first receiving tab disposed proximate the first vent opening and a second channel defined by a second receiving tab disposed proximate the second vent opening; where the exhaust adaptor additionally includes at least one flange projecting from a perimeter of the exhaust adaptor; and where the first channel defined by the first receiving tab slidably engages the at least one flange on the first vent opening or the second channel defined by the second receiving tab slidably engages the at least one flange on the second vent opening.

In another aspect, an installation kit for mounting an over-the-range cooking appliance includes: a bracket body including a first vent opening to engage an exhaust of the over-the-range cooking appliance and a second vent opening adapted to engage the exhaust of the over-the-range cooking appliance; an exhaust adaptor, where the exhaust adaptor further includes: a first side, where when installed the first side of the exhaust adaptor slidably engages the first vent opening or the second vent opening based on a position of an external vent; a second side disposed opposing the first side with a through opening; where the second side of the exhaust adaptor engages the external vent when installed; where when the first side of the exhaust adaptor is slidably engaged with the bracket body at the first or the second vent opening, there is fluid communication between the first or the second vent opening and the exhaust adaptor; a gasket, where the gasket surrounds a perimeter surface of the first vent opening or the second vent opening; and where when the over-the-range cooking appliance is installed, the gasket is disposed between the bracket body and the cooking appliance.

In some implementations, the installation kit further includes a damper disposed within the through opening. In various implementations, the bracket body additionally includes installation openings for mounting the bracket body on a wall. In other implementations, the bracket body further includes: a first channel defined by a first receiving tab disposed proximate the first vent opening; a second channel defined by a second receiving tab disposed proximate the second vent opening; where the exhaust adaptor additionally includes at least one flange projecting from a perimeter of the exhaust adaptor; and where when the first vent opening is used the first channel defined by the first receiving tab slidably engages the at least one flange by movement of the bracket body in a first direction, or when the second vent opening is used the second channel defined by the second receiving tab engaged the at least one flange by movement of the bracket body in a second direction.

In some implementations, the bracket body additionally includes a cooperating latch member adapted to latch to a second cooperating latch member disposed on the cooking appliance. In various implementations, the bracket body further comprises an arcuate notch along an outer periphery of the bracket body to receive a drill paddle.

In another aspect, a method of connecting an external vent to an over-the-range cooking appliance includes: attaching an exhaust adaptor to the external vent in at least one of a wall or upper cabinet; moving a mounting bracket along the wall or the upper cabinet; slidably engaging the mounting bracket comprising a vent opening and the exhaust adaptor to thereby align the vent opening with a through opening of the exhaust adaptor with the external vent; attaching the mounting bracket to the at least one of the wall or the upper cabinet; and mounting the cooking appliance to the mounting bracket thereby aligning an exhaust of the cooking appliance with the through opening of the exhaust adaptor, thereby allowing fluid communication between the exhaust of the over-the-range cooking appliance and the external vent.

In some implementations, the method further includes: sealing the cooking appliance to the mounting bracket with a gasket disposed around a perimeter surface of the vent opening between the cooking appliance and the mounting bracket. In various implementations, slidably engaging the mounting bracket with vent opening and the exhaust adaptor further includes: slidably engaging one or more flanges disposed at a periphery of the through opening of the exhaust adaptor with one or more channels defined by one or more receiving tabs dispose proximate the vent opening of the mounting bracket. In some aspects, the method additionally includes: determining, based on a configuration of the external vent, an installation position of the mounting bracket; and attaching the exhaust adaptor relative to the installation position of the mounting bracket.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-B are simplistic perspective views of a rear of an over-the-range cooking appliance consistent with some implementations described herein.

FIGS. 8A-C are partial views of mounting brackets with various cooperating latch members for attachment to the over-the-range cooking appliance.

DETAILED DESCRIPTION

The embodiments discussed hereinafter are directed in part to a mounting bracket for mounting an over-the-range cooking appliance. The mounting includes, in some implementations, a bracket body that can be secured to a wall and can support a cooking appliance. The bracket body may also include a vent opening that can engage an external exhaust of the cooking appliance. Such a bracket also includes an exhaust adaptor with a first and second side with a through opening therebetween. The second side of the exhaust adaptor can engage an external vent (e.g. in a wall, cabinet, or the like), while the first side of the exhaust adaptor can slidably engage with the bracket body at the vent opening. When engaged as described, there is fluid communication between the vent opening and the exhaust adaptor, so as to allow air to fluidly flow from the external exhaust of the cooking appliance through the bracket and exhaust adaptor to and through the external vent. The implementations illustrated focus on mounting a microwave cooking appliance, but it will be appreciated that the herein-described techniques may be used to mount other types of over-the-range cooking appliances, so the invention is not limited to use with microwave cooking appliances.

Figure 1:
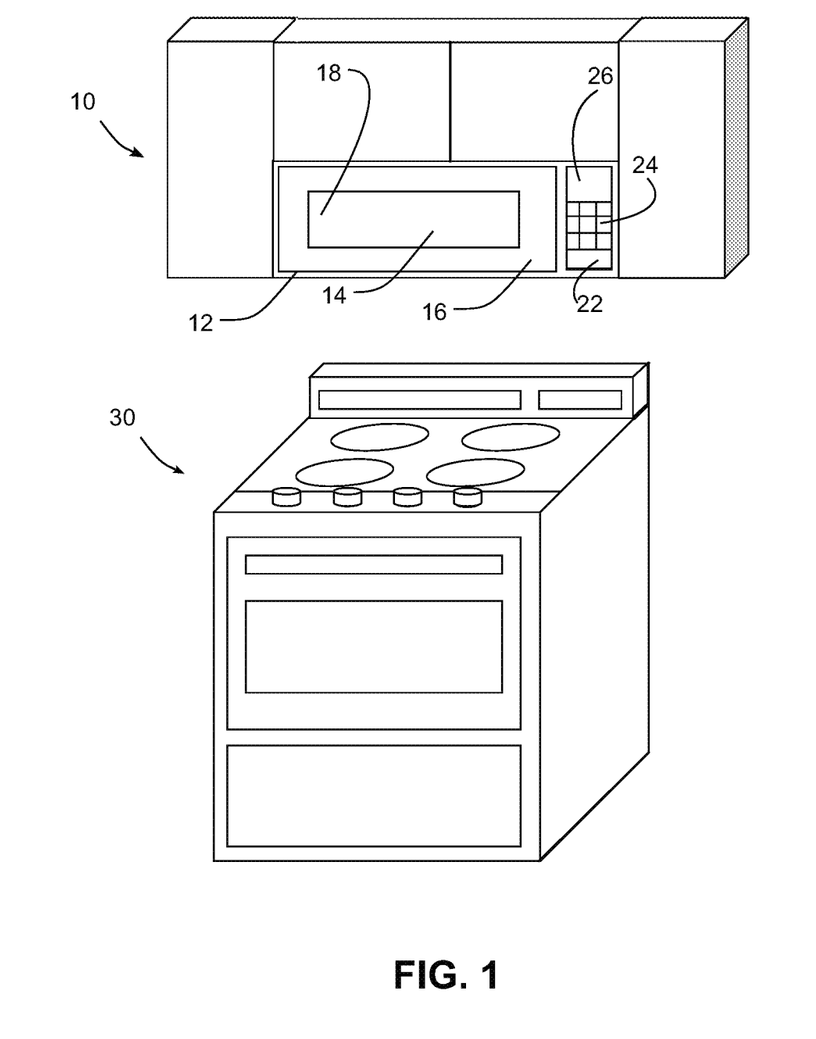
FIG. 1 is a perspective view of an over-the-range cooking appliance consistent with some implementations described herein.

Turning now to the drawings, wherein like numbers denote like parts throughout the several views, FIG. 1 illustrates an example over-the-range microwave cooking appliance 10 in which the various technologies and techniques described herein may be implemented. The microwave cooking appliance 10 illustrated in FIG. 1 is an over-the-range microwave installed over the stove 30. Over-the-range microwaves offer several advantages over a countertop microwave, including that they do not take up valuable counter space and may provide a neater appearance to the kitchen. The over-the-range microwave cooking appliance 10 is a residential-type microwave cooking appliance, and as such includes a housing or enclosure 12, which further includes a cooking cavity 14, as well as a door 16 disposed adjacent the respective opening of the cooking cavity 14. In some embodiments, the door 16 may further include a window 18 that allows a user to view the items inside the cooking cavity 14. In some embodiments, in place of, or in addition to, the handle (not illustrated), the over-the-range microwave cooking appliance 10 may include a button 22 that a user may press to trigger the opening of the door 16.

The over-the-range microwave cooking appliance 10 may also include one or more user activated controls 24, which may be in the form of buttons, knobs, a touchscreen, or the like. In some embodiments, these user-activated controls 24 may be used to program a cooking time and/or a cooking power level. In addition, in some embodiments, these user-activated controls 24 may be used to selected one or more preset conditions for a particular food item to be cooked or a particular desired action (e.g. "popcorn", "defrost", "frozen pizza", etc.). In some embodiments, the preset conditions may include one or more adaptive thermal sensing cycles such as an auto-defrost or auto-cook cycle, which are described in greater detailed herein. The over-the-range microwave cooking appliance 10 may also include a display 26, which may be used to convey a variety of information to a user. For example, in some embodiments, the display 26 may be used to display the time when the over-the-range microwave cooking appliance 10 is not in use. In other embodiments, the display 26 may be used to display cooking times, power levels and/or temperatures.

Figure 2A:
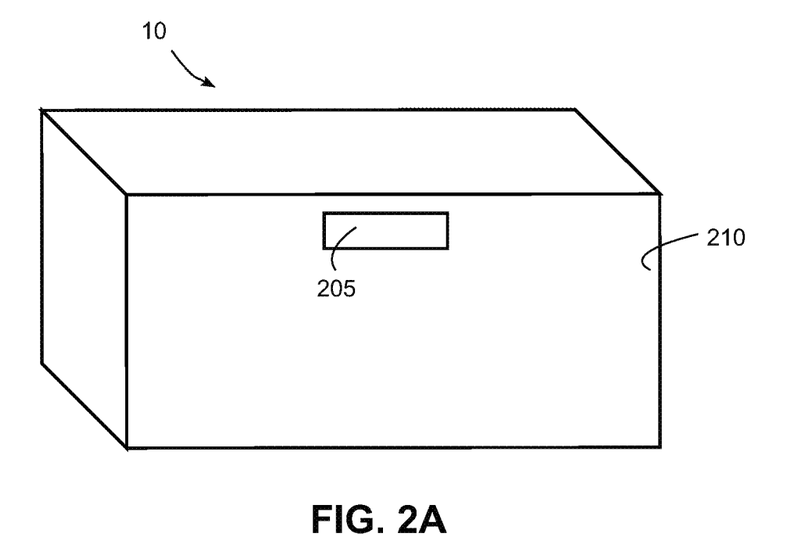
FIG. 2A illustrates a cooking appliance with an external exhaust on a rear portion of the appliance.
Figure 2B:
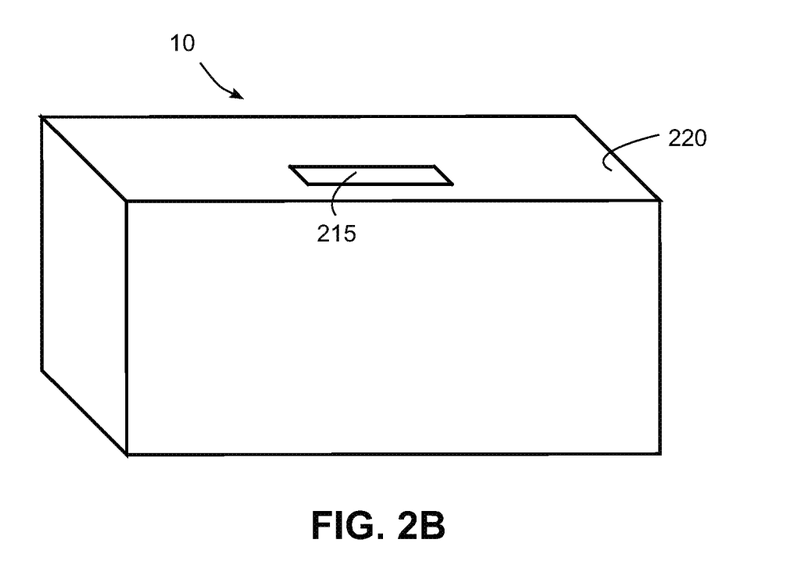
FIG. 2B illustrates a cooking appliance with an external exhaust on the top portion of the appliance.

Additionally, over-the-range microwave cooking appliances may have built in exhaust fans that serve as a stovetop ventilation system to minimize smoke, steam, and cooking odors. The location of the air vent for exhaust fan may vary between microwave cooking appliances. In some instances, the exhaust may internally ducted vent (e.g. the air is blown in out the front of the appliance). In other instances, the exhaust is externally vented. For example, in some implementations such as illustrated in FIG. 2A, the exhaust may be vented through an external exhaust opening 205 through a rear surface 210 of the microwave cooking appliance 10. In other implementations, such as illustrated in FIG. 2B, the exhaust may be vented through an external exhaust opening 215 through a top surface 220 of the microwave cooking appliance 10. The configuration of this external exhaust opening 205, 215 may determine the positioning of a mounting bracket for mounting the microwave 10 to the wall or cabinet, as will discussed in detail herein.

Mounting Bracket for an Over-the-Range Cooking Appliance

As described previously, over-the-range microwave cooking appliances typically require multiple people to install. Typically, an installer(s) use paper templates taped to a wall and/or cabinetry to properly locate the necessary holes to drill for both the power cord (through the upper cabinet), as well as the wall mounting bracket. Once the proper locations are determined, a first person may be required to hold the microwave in place, for example on a wall bracket, while a second person may insert the mounting screws downwardly through a bottom of the upper wall cabinet and thread them into the over-the-range microwave cooking appliance to hold the microwave cooking appliance. Where the appliance is externally vented, additional ducting must be connected to the cooking appliance, for example through use of an exhaust adapter and ductwork. The attachment of such an exhaust adaptor is traditionally done blind by an installer. There continues to be a need for a manner of mounting such a cooking appliance and hardware for the same that would allow a single person to install an over-the-range microwave, or where multiple people participate in the installation, to substantially simplify the installation process.

Figure 3:
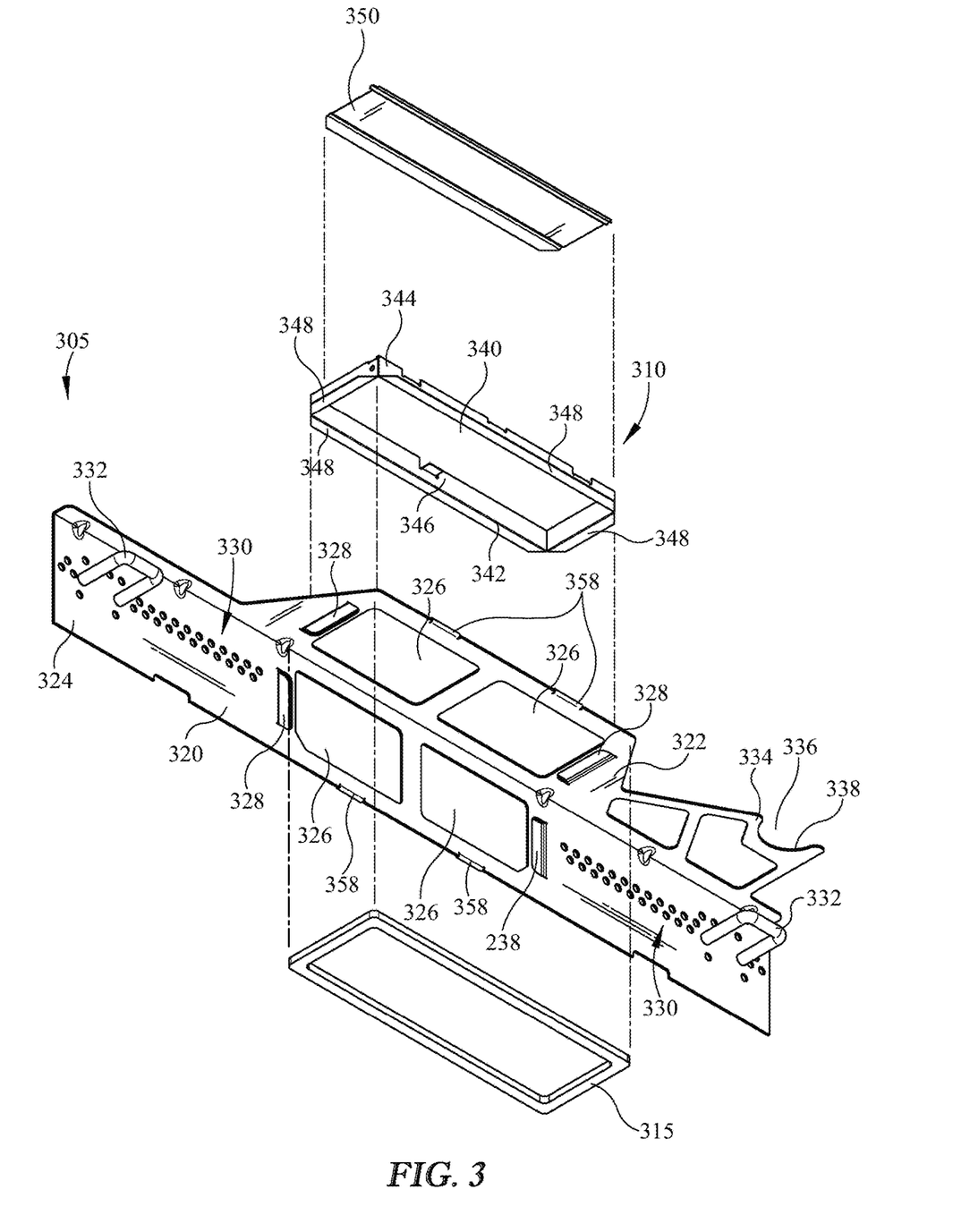
FIG. 3 is an exploded view of an implementation of an installation kit for an over-the-range cooking appliance consistent with some implementations described herein.

Referring now to FIG. 3, an exploded view of various components that may, in some implementations, constitute an installation kit for mounting an over-the-range cooking appliance, such as a microwave oven, is illustrated. Generally, the installation kit may include a mounting bracket 305, which in some implementations may further include an exhaust adaptor 310, and/a gasket 315. Specifically, the mounting bracket 305 may include a bracket body 320. In some implementations, such as illustrated in FIG. 3, the body 320 may further include a top portion 322 and a rear portion 324, each of which may further include one or more vent openings 326. It should be understood that the depicted bracket body 320 and/or vent opening(s) 326 are exemplary, and that a variety of shapes, sizes, materials, etc. for the bracket body 320 and/or vent opening(s) 326 are contemplated and may still be within the scope of the invention. For example, in some implementations, the bracket body 320 may only have a vent opening(s) on the top portion 322 or rear portion 324. Furthermore, although illustrated herein as two vent openings 326 on each of the top 322 and rear portions 324, this is not intended to be limiting. In some implementations, there may only be a single vent opening; in other implementations, there may be more than two vent openings. The vent opening(s) engage or fluidly communicate with the external exhaust of the cooking appliance when the appliance is secured to the mounting bracket 305.

The bracket body 320 can, in some implementations further include one or more receiving tabs 328 disposed at the periphery (e.g. inner and/or outer) of the vent opening(s) 326. The one or more receiving tabs 328 can slidably engage and/or hold in place the exhaust adaptor 310. For example, each receiving tab 328 can define a channel through which at least a portion of the exhaust adaptor 310 may slidably engage. In some implementations, as illustrated herein, the exhaust adaptor 310 can include one or more flanges 348 extending outward from the adaptor 310. The channels defined by the receiving tabs 328 may slidably engage the flange(s) 348 as the mounting bracket 305 is slid adjacent the wall or cabinet for installation. The channels defined by the receiving tabs 328 can allow for one directional movement (e.g. either horizontal movement or vertical movement depending on exhaust adaptor 310 placement) while restricting movement in the perpendicular direction. In some implementations, the bracket body 320 may additionally include one or more stop tabs 358 that may be disposed at a forward edge or outer periphery of the bracket body 320 to function as a positive stop for the exhaust adaptor 310. These stop tabs 358 can further facilitate alignment of the exhaust adaptor 310 and the vent opening(s) 326. As such, the stop tabs 358 may restrict the movement of the exhaust adaptor 310 and prevent the exhaust adaptor 310 from extending beyond a desired placement. In other implementations, there may be a screw or a raised indentation 360 to secure the flanges 348 of the exhaust adapter 310 once the exhaust adaptor has been positioned and is disposed against the stop tab(s) 358.

The body 320 of the mounting bracket 305 may be secured to the wall and/or cabinet by one or more attachment mechanisms (e.g. hinge, hook, fasteners, screws, bolts, etc.). In the implementation illustrated in FIG. 3, the bracket body 320 may include a plurality of holes 330 through the body 320, through which an installer may place one or more screws to secure the bracket body 320 to a wall and/or cabinet. As illustrated, the plurality of holes 330 are positioned, so that the installer can arrange the mounting bracket 305 so that the vent opening(s) 326 align with the external vent, and/or so that the installer may locate a stud on either side of the vent opening(s) 326 for mounting the bracket 305 to a wall. The bracket body 320 may also include, in some implementations, one or more cooperating latch members 332 (e.g. a "U"-shaped fastener) that latch to a corresponding cooperating latch member (e.g. a hook) on the cooking appliance so that the cooperating latch member attach or couple with one another when the cooking appliance is pivoted or tilted upwardly into place on the bracket. These cooperating latch members 332 may have a variety of forms, some other examples of which are described with reference to FIGS. 8A-C herein. In some implementations, the cooperating latch members 332 or other attachment mechanisms may allow the appliance to be adjustable in position (e.g. horizontally, vertically, etc.) relative to mounting bracket 305 and/or exhaust adaptor 310 and then be secured.

The mounting bracket 305 may further include an integral drill guide 334 to facilitate an installer in determining where to drill into the upper cabinet or other mounting surface. In some implementations, the drill guide 334 may be an opening or partial opening (e.g. an arcuate notch 336 defining a portion of the peripheral edge 338) of the bracket body 320 sized and shaped so as to receive a drill paddle, spade bit, auger, hole saw, or any other suitable drill bit, as will be discussed in detail with reference to FIG. 9-10.

The installation kit for mounting an over-the-range cooking appliance oven may further an include exhaust adaptor 310. The exhaust adaptor 310 may be constructed of metal, a plastic (e.g. a plastic rated for high temperatures), a combination thereof, or any other suitable materials. Once coupled with an external vent, the exhaust adaptor 310 may slidably engage the body 320 of the mounting bracket 305. For example, the exhaust adaptor 310 may be slid into the channel(s) defined by the receiving tab(s) 328 as the mounting bracket 305 is slide into place; this fluidly connects the external vent (not illustrated) to the external exhaust of the cooking appliance. In such implementations, the bracket body 320 may be slid adjacent the wall or cabinet (depending on the positioning the external exhaust and exhaust adaptor). The exhaust adaptor 310 may define one or more through openings 340, which may extend between a first side 342 of the exhaust adaptor 310 to an opposing second side 344. The first side 342 may be adapted to engage the body 320 of the mounting bracket 305. The second side 344 may be adapted to engage the external vent (see e.g. FIGS. 5 and 7). The through opening 340 defines an inner periphery 346 of the exhaust adaptor 310. As discussed, the exhaust adaptor can include one or more flanges 348, which may extend in opposing directions from the exhaust adaptor 310. In some implementations, the flange 348 may extend away from the exhaust adaptor 310 only on one side. However, in other implementations, the flange 348 may extend from the exhaust adaptor at two, three, or the entire periphery of the exhaust adaptor 310 (as illustrated in FIG. 3).

In some implementations, the adaptor 310 can additionally include one or more dampers 350. These dampers 350 can be positioned in an air flow path that extends from the external exhaust of the cooking appliance through the one or more through openings 340 of the exhaust adaptor 310 to the external vent. As illustrated in FIG. 3, the damper 350 can be positioned within the through opening 340 of the exhaust adaptor 310, and may move between an open position, where the through opening 340 is substantially unobstructed, and a closed position, where the damper 350 substantially obstructs the through opening 340 (as illustrated in FIG. 3). The damper 350 may also be in any position between the open and closed positions. When there is an increase in the air flow from the external exhaust of the cooking appliance (e.g. during operation of the fan and/or the cooking appliance), the damper 350 may be at least partially open to accommodate this increase in air flow through the exhaust adaptor 310 to the external vent. When the air flow decreases (e.g. when the cooking appliance and/or fan contained therein powers off), the damper 350 may return to the closed position. In some implementations, the damper 350 may be controlled solely by the movement of air and gravity; however, in other implementations, control of the movement of the damper between the open and closed positions (or anywhere therebetween) may be electronically and/or mechanically controlled.

The installation kit for mounting an over-the-range cooking appliance may further include a gasket 315 or other sealing mechanism. This gasket 315 can be positioned between the cooking appliance, mounting bracket 305, exhaust adaptor 310, and/or the external vent. As illustrated herein, the gasket 315 can be disposed and/or compressed between the body 320 of the mounting bracket 305 and the cooking appliance. In some implementations, the gasket 315 can be placed around the periphery of the one or more vent openings 326. In such a configuration, the dimensions of the gasket 315 may be slightly larger than the dimensions of the vent opening(s). The gasket 315 may be constructed of a rubber, neoprene, an open celled foam, and/or any other suitable material. In some implementations the gasket can include an adhesive disposed thereon, so as to allow an installer to attach the gasket 315 to the bracket body 320 at the periphery of the vent opening(s) 326.

Although described with reference to FIG. 3 as a "kit", this is not to be construed as limiting or that each component illustrated in FIG. 3 is required. In some implementations the "kit" may include only the bracket body 320. In other implementations the "kit" may include the bracket body 3120 and the adaptor 310, and/or gasket 315.

Figure 4:
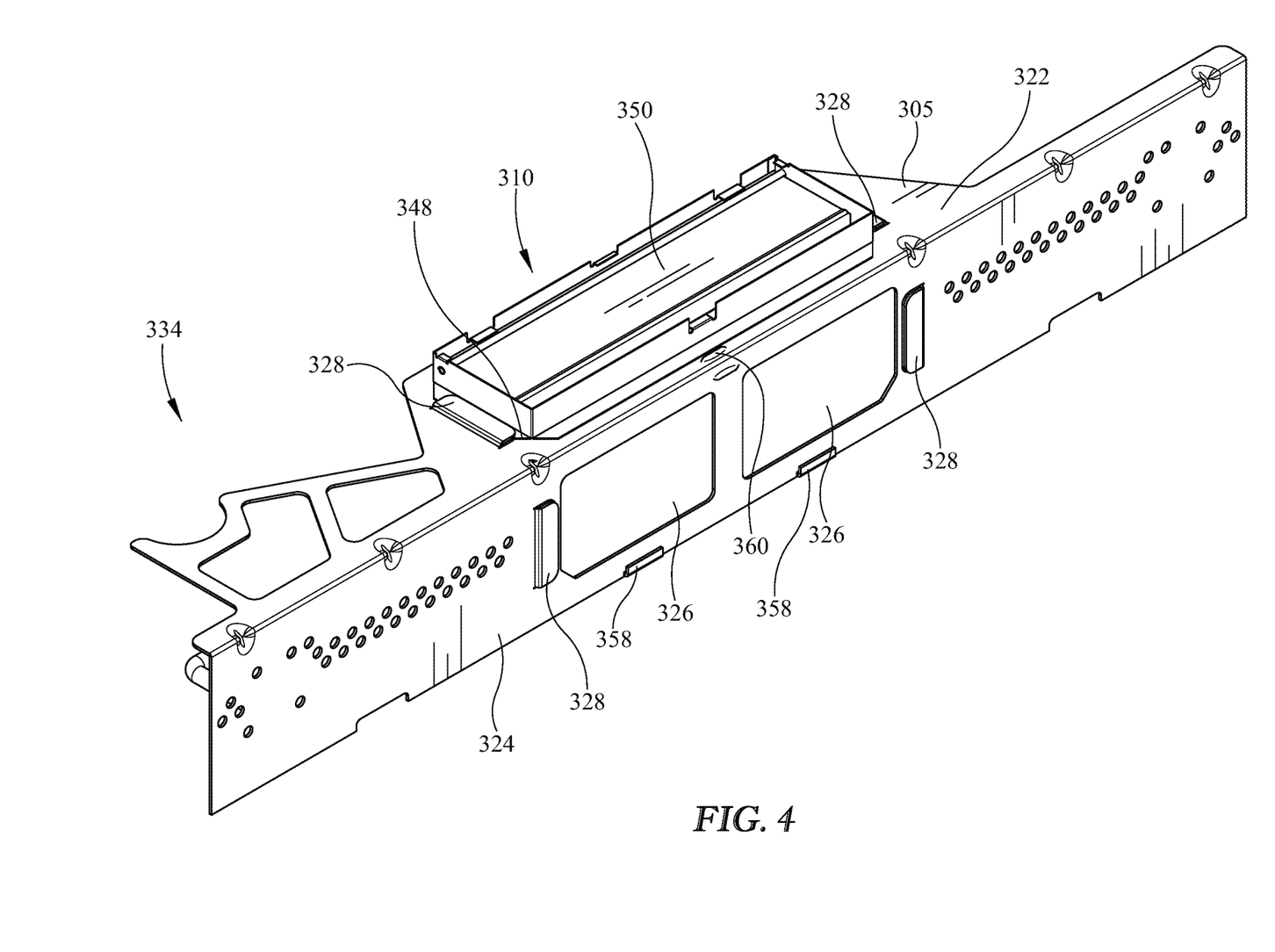
FIG. 4 is a perspective view of a mounting bracket with an exhaust adaptor in a first position consistent with some implementations described herein.
Figure 5:
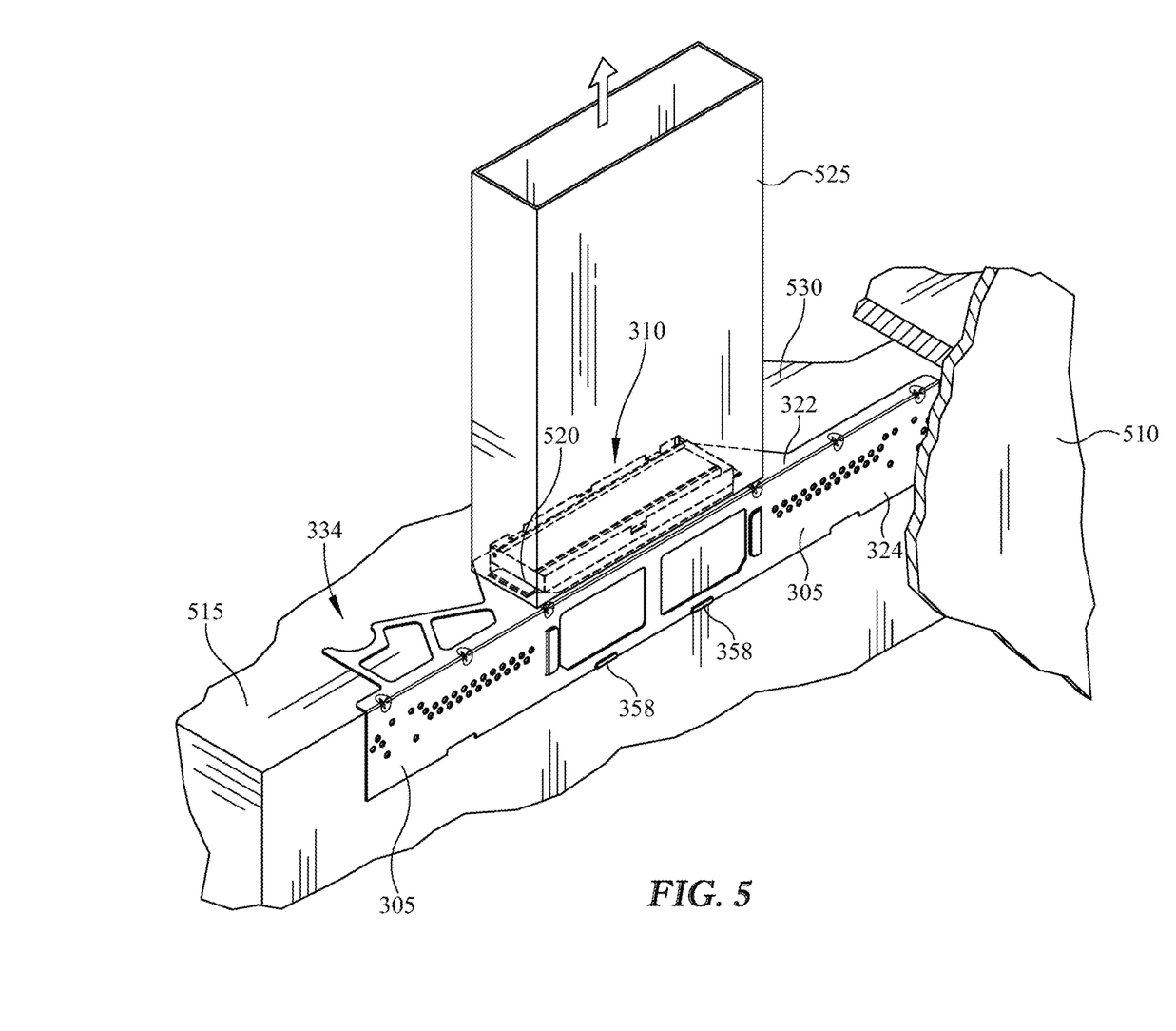
FIG. 5 is perspective view of the mounting bracket and exhaust adaptor of FIG. 4.
Figure 6:
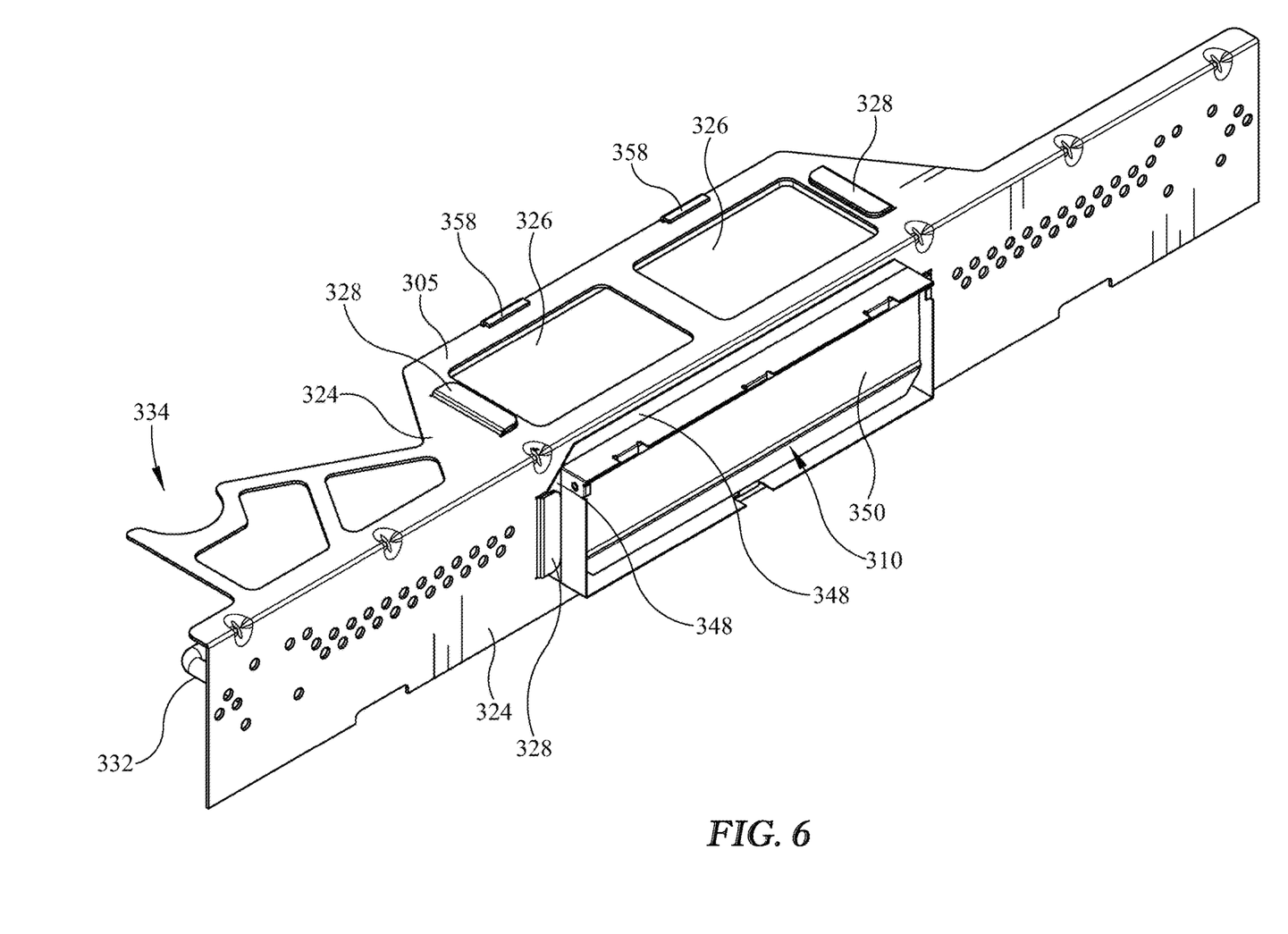
FIG. 6 is perspective view of a mounting bracket of FIG. 4 with an exhaust adaptor in a second position.
Figure 7:
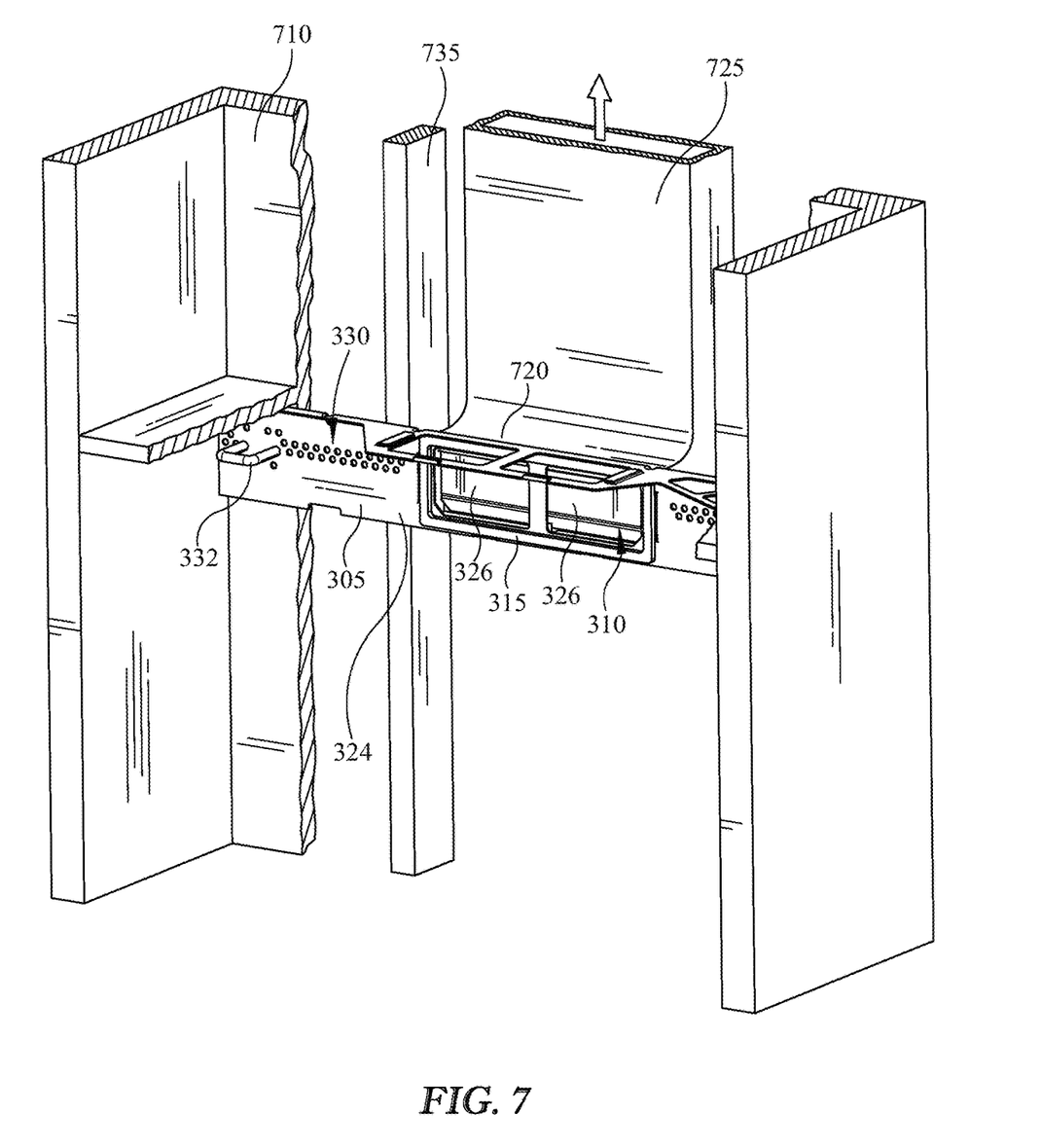
FIG. 7 is a perspective view of the mounting bracket and exhaust adaptor of FIG. 4 mounted to a wall.

Turning now to FIGS. 4-7, the mounting bracket 305 is illustrated with the exhaust adaptor 310 in varied positions. FIGS. 4-5 illustrate the exhaust adaptor 310 in a first position, and FIGS. 6-7 illustrate the exhaust adaptor in second position. In FIGS. 4-5, the is exhaust adaptor 310 has been connected to a top external vent 525. The top portion 322 of the body 320 of the mounting bracket 305 slidably engaged the exhaust adaptor 310 through the channels defined by the receiving tabs 328. To achieve this engagement, the mounting bracket 305 may be slid proximate the cabinet (cutaway in FIG. 5) to so that the channel defined by the receiving tabs 328 on the bracket 305 may receive the exhaust adaptor 310. As discussed with reference to FIG. 3, the bracket body 320 may also include one or more stop tabs 358 at a forward edge or outer periphery of the bracket body 320 that are a positive stop for the exhaust adaptor 310. The stop tabs 358 can facilitate alignment of the exhaust adaptor 310 and the vent opening(s) 326, as well as restrict the movement of the exhaust adaptor 310 and prevent the exhaust adaptor 310 from extending beyond a desired placement. The mounting bracket 305 is secured to a wall 510, although the wall 510 is partially broken away and thus not wholly visible; the mounting bracket is also attached to the cooking appliance, illustrated herein as a microwave 515, through any number of cooperating latch members, for example any of those illustrated and described herein with reference to FIGS. 8A-C. In some implementations, one or more fasteners 520, for example one or more clamps, rivets, screws, or the like can secure the external vent 525 to the exhaust adaptor 310. In some implementations, such as illustrated herein, the external vent 525 may be rigid; while in other implementations the external vent may be constructed of a flexible material. Where a flexible material is used for the external vent, the material may be lengthened or shortened as needed. In the illustrated position, the external exhaust (not visible) of the microwave 515 is positioned on a top surface 530 of the microwave 515. The exhaust adaptor 310 fluidly couples the body 320 of the mounting bracket 305 (e.g. through receiving tab(s) 328) and the external vent 525 to the microwave 515. These engagements allow for fluid communication between the and the exhaust adaptor 310 the external exhaust (not visible) of the microwave 515 and the external vent 525.

In FIGS. 6-7, the is exhaust adaptor 310 has been connected to a rear external vent 725. The rear portion 324 of the body 320 of the mounting bracket 305 slidably engaged the exhaust adaptor 310 through the channels defined by the receiving tabs 328. To achieve this engagement, the mounting bracket 305 is slid proximate the wall 710 (partially cutaway in FIG. 7) to so that the channel defined by the receiving tabs 328 on the bracket 305 receives the exhaust adaptor 310. The mounting bracket 305 is secured to a wall 710, for example at one or more studs 735. The mounting bracket is also attached to the cooking appliance (not present in FIGS. 6-7) through one or more cooperating latch members 332. As discussed previously, one or more fasteners 720 can secure the external vent 725 to the exhaust adaptor 310. The orientation/position of the external vent 725 may require the external exhaust of the cooking appliance (not illustrated) to be positioned on a rear wall of the cooking appliance (see FIG. 2A). These engagements allow for fluid communication between the and the exhaust adaptor 310 the external exhaust of the cooking appliance and the external vent 725.

Figure 8A:
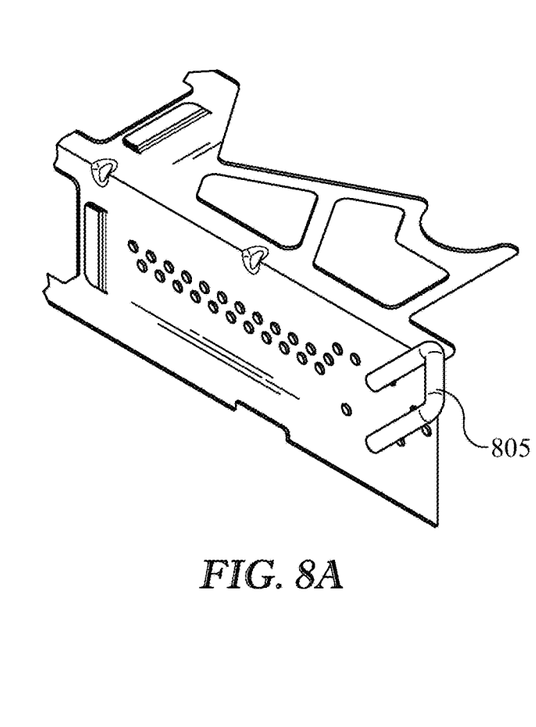
FIG. 8A is a partial view of a mounting bracket having a first implementation of a cooperating latch member.
Figure 8B:
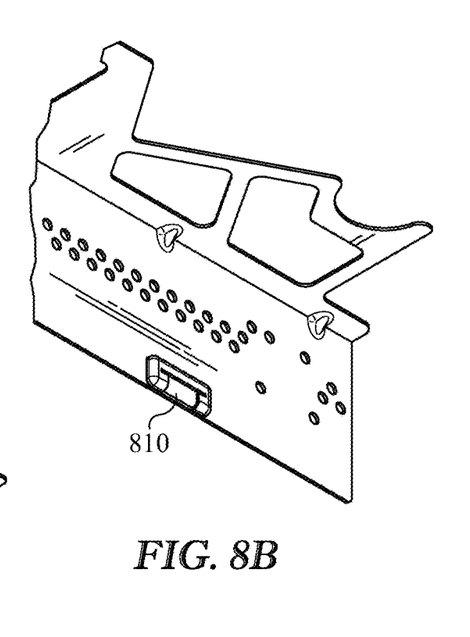
FIG. 8B is a partial view of a mounting bracket having a second implementation of a cooperating latch member.
Figure 8C:
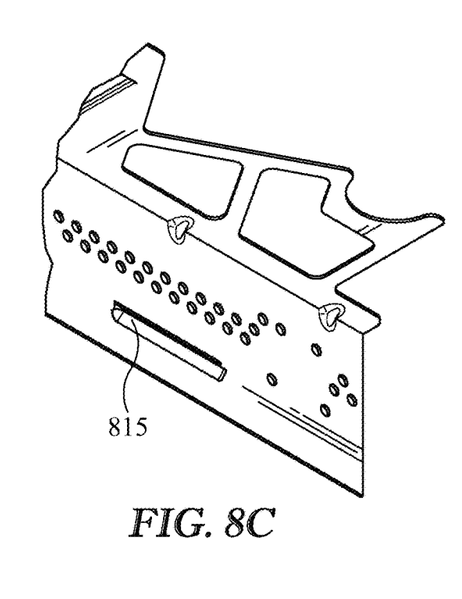
FIG. 8C is a partial view of a mounting bracket with a third implementation of a cooperating latch member.

FIGS. 8A-C illustrate various other implementations of cooperating latch members for coupling a cooking appliance to the mounting bracket 305. Generally, a user may lift the cooking appliance, tilt it forward, and attach a cooperating latch member (e.g. the back edges, hooks, or the like) of the appliance onto the corresponding cooperative latch member of the mounting bracket 305. FIGS. 3 and 7 illustrate one exemplary implementation of a cooperative latch member 332 in the form of a horizontal "U"-shaped fastener that latches to a corresponding cooperating latch member (e.g. a hook) on the cooking appliance. FIG. 8A illustrates another, very similar, exemplary implementation of a cooperative latch member 805 in the form of a vertical "U"-shaped fastener, which also latches to a corresponding cooperating latch member (e.g. a hook) on the cooking appliance. FIG. 8B illustrates yet another implementation of a cooperating latch member 810 or attachment mechanisms. The implementation illustrated in FIG. 8B is another hook/fastener implementation. Similar to previous implementations described herein, the cooking appliance can have a corresponding cooperating latch member to engage the mounting bracket 305. FIG. 8C illustrated still yet another implementation of a cooperating latch member 810 in the form of a French cleat 815, which includes a sloped molding 820. The cooking appliance may include a corresponding cooperating latch member also in the form of a French cleat (e.g. a matching edge on the cooking appliance to cooperate with that on the mounting bracket 305). Once the cooking appliance is secured to the mounting bracket 305, the external exhaust of the cooking appliance can be aligned or in fluid communication with the through opening 340 of exhaust adaptor 310 and/or the mounting bracket vent opening 326, allowing fluid communication with the external vent. Other attachment mechanisms that may be used for attaching mounting bracket 305 and cooking appliance may include, but not be limited to, hinges, hooks, fasteners, screws, bolts, etc.

Figure 9:
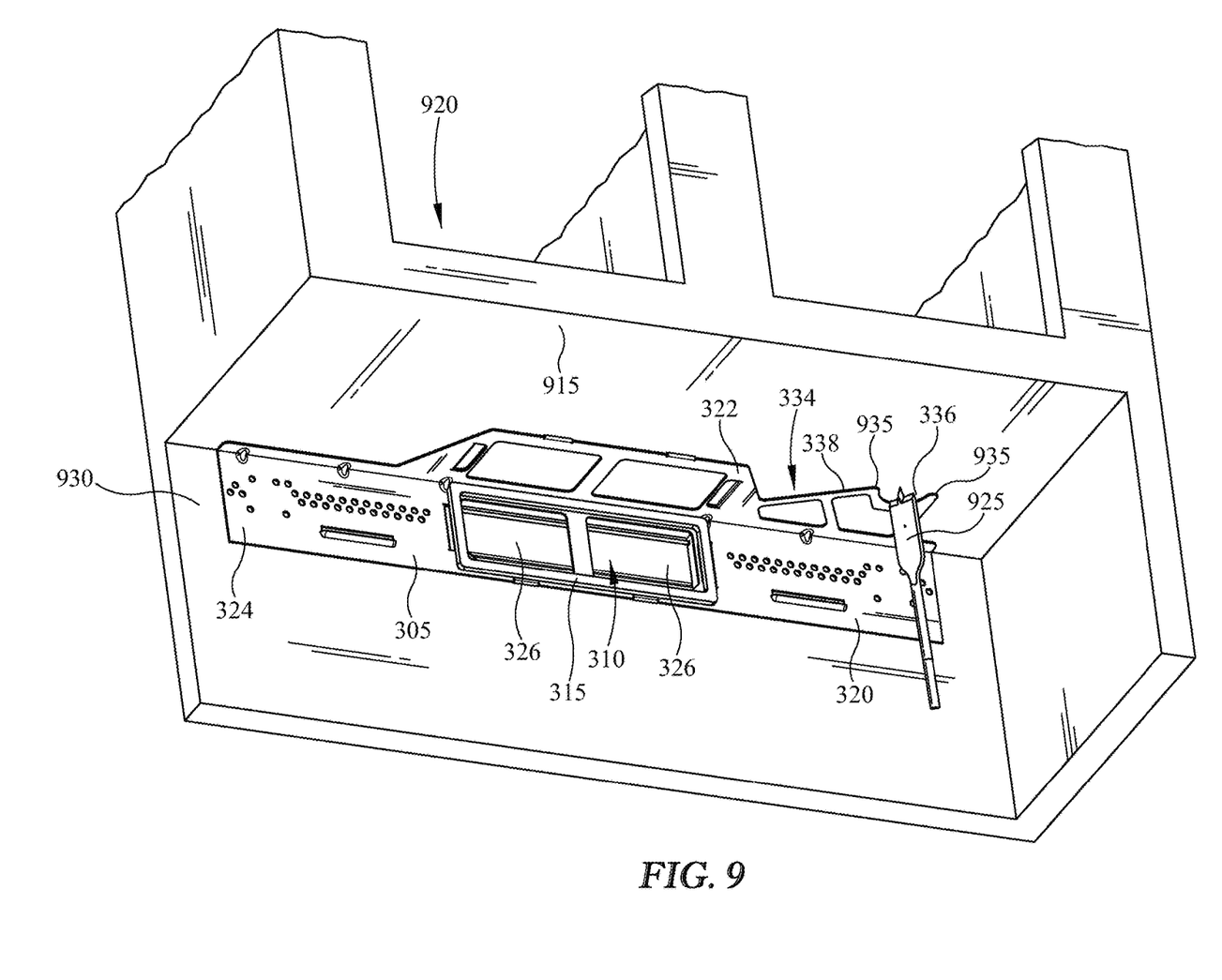
FIG. 9 is a lower perspective view of a mounting bracket with a drill guide consistent with some embodiments of the implementations herein.
Figure 10:
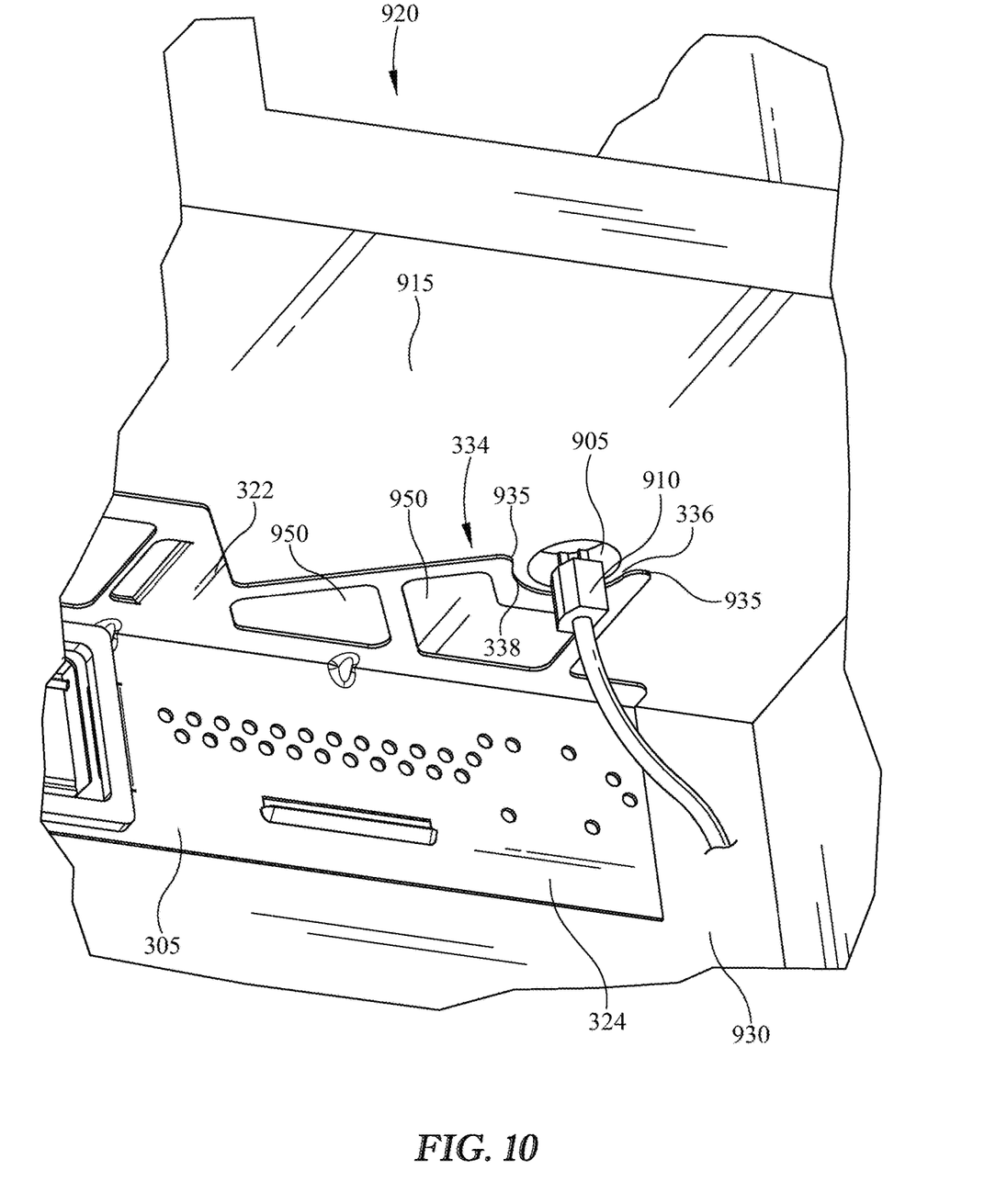
FIG. 10 is a partial lower perspective view of the mounting bracket of FIG. 9 consistent with some embodiments of the implementations herein.

Turning now to FIGS. 9-10, the drill guide 334 is illustrated and described in detail. As mentioned previously, the mounting bracket 305, in some instances, further includes a drill guide 334 to facilitate a user in determining a desired placement for a hole 905 through the upper cabinet 920 to receive a power cord 910 of the cooking appliance. Traditionally, locating a position for the hole in the upper cabinetry for routing a power cable has been achieved through use of a paper template that may be taped to a bottom surface 915 of the cabinet 920. In contrast, the mounting bracket 305 described herein provides an integrated drill guide 334 that does not require additional templates.

Such a drill guide 334 can, in some implementations, be disposed on the top portion 322 of the bracket body 320. In some implementations, the rear portion 324 of the bracket body 320 can include a plurality of holes 330 through which an installer may place one or more screws to secure the bracket body 320 to a wall. As described herein, the plurality of holes 330 are used to mount the bracket 305, specifically the rear portion 324 thereof, to a wall 930. The bracket 305 may be installed so that when the rear portion 324 is attached to the wall 930, the top portion 322 of the mounting bracket 305 is proximate an upper cabinet 920. Once the mounting bracket is positioned and/or secured to the wall 930, one or more installers may use the integrated drill guide 334 to locate the appropriate position for drilling the hole 905 through the upper cabinet 920 to receive a power cord 910 of the cooking appliance.

In some implementations, the drill guide 334 may be a partial or complete opening through the bracket body 320 to accommodate the appropriately sized drill bit 925 for generation of the opening 905 through the upper cabinet 920. The drill guide may be, in some implementations, a discontinuous opening or an arcuate notch 336 defining a portion of the peripheral edge 338 of the bracket body 320, so that the discontinuous opening or arcuate notch 336 may form the peripheral edge 338 of the top portion 322 of the bracket 305. In some instances, such as illustrated herein, the drill guide 334 may be non-binding so as to allow for various sizes of the drill bit, paddle, or the like utilized for making the opening 905 through the upper cabinet 920. The drill guide 334 can be sized and positioned to accommodate the appropriately sized drill bit, paddle 925, etc. In some implementations, the hole 905 for the receiving the power cord 910 may be about 1 to about 2 inches, and as such the drill guide 334 may be large enough so as to receive a 1-inch drill bit, such as, for example a 1-inch drill spade; in other implementations, the drill guide 334 may be large enough to receive a 2-inch drill bit, for example drill spade. In still other implementations, the drill guide 334 may be large enough to receive a drill bit sized between 1-inch and 2-inches (e.g. 1¼ inch, 1½ inch, 1¾ inch, and so on). However, these sizes are not intended to be limiting, as the hole may be larger or smaller depending of the size of power cord 910 being received. Although illustrated as a drill paddle 925 or spade, this is not intended to be limiting; for example, in some instances a spade bit, auger, hole saw, or any other suitable drill bit may be used.

In implementations where the drill guide 334 is an arcuate notch 336, the arcuate notch 336 may additional include one or more rounded edges 935, which may in some instances, define the end points of the arcuate notch 336 opening. When the mounting bracket 305 is installed, the arcuate notch 336 may face an installer, such that when viewed from the perspective of the installer the notch is concave and opens outwardly toward the installer. In some implementations, such as illustrated herein, the arcuate notch 336 may have an angle of approximately 180 degrees. In other implementations, the arcuate notch may have an angle of less that 180 degrees. The drill guide 334 may be, as illustrated herein, disposed proximate a first end 940 of the mounting bracket 305. However, this is not intended to be limiting, as the drill guide 334 may also be disposed proximate the second end 945 of the mounting bracket 305 or anywhere in-between the first 940 and second ends 945 of the bracket 305. Furthermore, the drill guide 334 may be located at any suitable location for generation of an opening 925 through which a power cord 910 may pass, including, in some implementations, away from the periphery of the bracket body 320. In some implementations, the location of the drill guide 334 may directly correspond to an opening on the microwave housing for the power cord. In other implementations, the mounting bracket 305 may include multiple drill guides 334 to accommodate varied positioning of the opening in the housing of the microwave housing; for example, there may be a drill guide 334 proximate each of the first end 940 and the second end 945 of the mounting bracket 305.

Additionally, although the upper portion 322 of the bracket body 320 is illustrated as include a plurality of openings 950 proximate the drill guide 334, these are not intended to be limiting. In some implementations, these openings (or optionally a single opening) may make the upper portion 322 of the bracket body 320 lighter, less expensive, etc. Furthermore, the size, shape, etc. of these openings 950, if present, may vary. In other implementations, these may be closed and the upper portion 322 of the bracket body 320 may be solid.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A bracket for mounting an over-the-range cooking appliance, the bracket comprising:
    a bracket body to be secured to a wall and support the cooking appliance, the bracket body further including:
        two intersecting planes open at each of a first end and a second end, wherein each of the two intersecting planes includes:
            a vent opening to engage an exhaust of the cooking appliance when installed;
            at least one channel defined by at least one receiving tab disposed proximate the vent opening;
            one or more stop tabs disposed at an outer periphery of the bracket body;
    a rectangular-shaped exhaust adaptor including a first side and a second side, wherein the first side is disposed opposing the second side with a through opening;
    wherein the second side of the rectangular-shaped exhaust adaptor projects into an external vent when installed;
    wherein the rectangular-shaped exhaust adaptor includes at least one flange projecting from a perimeter of the first side defined by least one wall that extends transverse to the through opening, wherein the at least one channel of the at least one receiving tab slidably engages the at least one flange; and
    wherein when slidably engaged with the at least one channel defined by the at least one receiving tab by movement of the bracket body in a first direction, the one or more stop tabs stop movement of the rectangular-shaped exhaust adaptor and there is fluid communication between the vent opening and the rectangular-shaped exhaust adaptor.

2. The bracket of claim 1, wherein a raised indention secures the at least one flange projecting from a perimeter of the rectangular-shaped exhaust adaptor when slidably engaged with the at least one channel and disposed against the one or more stop tabs.

3. The bracket of claim 1, wherein the at least one channel defined by the at least one receiving tab restricts movement of the rectangular-shaped exhaust adaptor in a second direction, wherein the second direction is perpendicular to the first direction.

4. The bracket of claim 1, wherein the rectangular-shaped exhaust adaptor further comprises a damper disposed within the through opening.

5. The bracket of claim 1 further comprising:
    a gasket;
    wherein the gasket surrounds a perimeter surface of the vent opening; and
    wherein when the cooking appliance is installed, the gasket is disposed between the bracket body and the over-the-range cooking appliance.

6. The bracket of claim 1, wherein the bracket body further comprises a plurality of installation openings for mounting the bracket body on the wall.

7. The bracket of claim 1, wherein the bracket body further comprises a cooperating latch member to latch to a second cooperating latch member disposed on the cooking appliance.

8. The bracket of claim 1, wherein the bracket body further comprises an arcuate notch defining an outer periphery of the bracket body to receive a drill paddle.

9. The bracket of claim 1, wherein the vent opening is a first vent opening, and the bracket body further includes a second vent opening; and
    wherein the first side of the rectangular-shaped exhaust adaptor is adapted to engage the first vent opening or the second vent opening based on a position of the external vent.

10. An installation kit for mounting an over-the-range cooking appliance, the installation kit comprising:
    a bracket body including
        two intersecting planes open at each of a first end and a second end, wherein each of the two intersecting planes includes a first vent opening and a first stop tab disposed at an outer periphery of the bracket body adapted to engage an exhaust of the over-the-range cooking appliance and a second vent opening and a second stop tab disposed at an outer periphery of the bracket body adapted to engage the exhaust of the over-the-range cooking appliance;
    a rectangular-shaped exhaust adaptor, wherein the rectangular-shaped exhaust adaptor further includes:
        a first side, wherein when installed the first side of the rectangular-shaped exhaust adaptor slidably engages either the first vent opening or the second vent opening not both based on a position of an external vent;
        a second side disposed opposing the first side with a through opening;
        wherein the second side of the rectangular-shaped exhaust adaptor projects into the external vent when installed;
        wherein the rectangular-shaped exhaust adaptor includes at least one flange projecting from a perimeter of the first side defined by at least one wall that extends transverse to the through opening, wherein the at least one channel of the at least one receiving tab slidably engages the at least one flange;
        wherein when the first side of the rectangular-shaped exhaust adaptor is slidably engaged with the bracket body at the first or the second vent opening the first stop tab or the second stop tab stops movement of the rectangular-shaped exhaust adaptor and, there is fluid communication between the first or the second vent opening and the rectangular-shaped exhaust adaptor;

a gasket, wherein the gasket surrounds a perimeter surface of the first vent opening or the second vent opening; and wherein when the over-the-range cooking appliance is installed, the gasket is disposed between the bracket body and the cooking appliance.

11. The installation kit of claim 10 further comprising a damper disposed within the through opening.

12. The installation kit of claim 10, wherein the bracket body further comprises a plurality of installation openings for mounting the bracket body on a wall.

13. The installation kit of claim 10, wherein the bracket body further comprises:
a first channel defined by a first receiving tab disposed proximate the first vent opening;
a second channel defined by a second receiving tab disposed proximate the second vent opening; and
wherein when the first vent opening is used the first channel defined by the first receiving tab slidably engages the at least one flange by movement of the bracket body in a first direction, or when the second vent opening is used the second channel defined by the second receiving tab engaged the at least one flange by movement of the bracket body in a second direction.

14. The installation kit of claim 10, wherein the bracket body further comprises a cooperating latch member adapted to latch to a second cooperating latch member disposed on the cooking appliance.

15. The installation kit of claim 10 wherein the bracket body further comprises an arcuate notch along an outer periphery of the bracket body to receive a drill paddle.

16. The installation kit of claim 10, wherein the bracket body includes a top portion of the bracket body and bottom portion of the bracket body, wherein the top portion and the bottom portion form an approximately 90 degree angle.

17. The installation kit of claim 16, wherein the first vent opening is disposed on the top portion of the bracket body and the second vent opening is disposed on the bottom portion of the bracket body.

18. The bracket of claim 1, wherein the bracket body further comprises one or more raised screws disposed on the bracket body and wherein the one or more raised screws secures the at least one flange projecting from the perimeter of the rectangular-shaped exhausted adaptor when slidably engaged with the at least one channel and disposed against the one or more stop tabs.

* * * * *